United States Patent

Laane

[15] 3,655,919

[45] Apr. 11, 1972

[54] BILATERAL ELECTRICAL COMMUNICATION SWITCHING NETWORK

[72] Inventor: Rein Raymond Laane, Wheaton, Ill.

[73] Assignee: Bell Telephone Laboratories Incorporated, Berkeley Heights, N.J.

[22] Filed: Nov. 16, 1970

[21] Appl. No.: 89,598

[52] U.S. Cl. ....................179/18 GF

[51] Int. Cl. ....................H04q 3/50

[58] Field of Search ....................179/18 GF; 340/166

[56] References Cited

UNITED STATES PATENTS 3,027,427 3/1962 Woodin ....................179/18 GF

*Primary Examiner*—Kathleen H. Claffy
*Assistant Examiner*—William A. Helvestine
*Attorney*—R. J. Guenther and R. B. Ardis

[57] ABSTRACT

A communication switching network through which digital signals may be simultaneously transmitted in opposite directions during the same time slot on a single conducting path. The impedances at opposite ends of the path are deliberately mismatched with the result that digital information is transmitted from the low impedance to the high impedance end of the network as voltage changes while the same information may be simultaneously transmitted from the high impedance end to the low impedance end of the network as current changes.

18 Claims, 2 Drawing Figures

Patented April 11, 1972 3,655,919

2 Sheets-Sheet 1

INVENTOR
R. R. LAANE
BY
William H. Kamstra
ATTORNEY

BILATERAL ELECTRICAL COMMUNICATION SWITCHING NETWORK

BACKGROUND OF THE INVENTION

This invention relates to communications switching systems and more particularly to networks employed in such systems for selectively establishing transmission paths therethrough.

In a copending application of the present inventor, Ser. No. 89,599, filed Nov. 16, 1970, a switching network arrangement is disclosed in which unbalanced transmission paths including semi-conductor crosspoints are advantageously employed by deliberately mismatching the impedances at opposite ends of each path as seen from a crosspoint. Signal transmission, as a result, instead of taking the form of conventional current-voltage variations, involves relatively large current variations with only very small voltage changes. Particularly, coupling circuits are provided at the input and output terminations of the network which present to a crosspoint at the input end an impedance which is large compared with the impedances of the incoming and outgoing transmission lines and which present to a crosspoint at the output end an impedance which is small compared with the impedances of the latter lines. As a result, a number of limitations attending the use of present day semiconductor crosspoints are overcome, thereby making available their considerable advantages over metallic crosspoints heretofore generally employed in switching networks.

The introduction of a calculated mismatch of impedances between the input and output terminals of a switching network also offers advantages in another context. In the network arrangement of the aforecited application, signal transmission through the network during any given time interval in only one direction is contemplated, that is in the direction from the high impedance end to the low impedance end. This unilateral transmission is in accord with conventional practice wherein distinct paths are provided in each direction for two-way communication, realized either on a space or time division basis. In accordance with the present invention, by applying the high-to-low impedance principles referred to in the foregoing, a switching network arrangement is realized in which simultaneous two-way transmission of information signals over a single conducting path is possible.

Two-way voice transmission between parties over a single interconnecting conductor has long been known in the art. By employing a ground return, for example, a tolerable level of communication is possible with interference between oppositely directed voice signals presenting little, if any, problem. The time sharing nature of a conversational interchange between parties largely precludes simultaneous transmission in both directions on the conductor. Bilateral transmission of digital information on a single conducting path between two terminals during a given time interval is also known; however, provision in the digital case must be made against interference between oppositely directed bits. This is accomplished in one known arrangement by temporarily storing at an intermediate point in the path during one clock phase the bits being oppositely transmitted. During a subsequent clock phase, each bit completes its transit on the conductor path portion earlier occupied by the other. The two bits thus time share the two terminal sections of the single transmission path of the network. Obviously, a communication network making possible simultaneous two-way transmission on a single conductor between two points without the necessity of time sharing would realize not only substantial savings in cost of hardware and reduction in circuit complexity, but would also achieve an important increase in transmission capacity.

Accordingly, it is an object of this invention to improve the simultaneous bilateral transmission of communication signals on a single conductor connecting communicating terminals.

It is another object of this invention to make possible the bilateral transmission over a single conductor of two data bits in the same time slot.

Another object of this invention is to provide new and novel input-output circuits for a transmission network making possible bilateral communication therethrough by means of a minimum number of conductors.

A further object of this invention is to reduce the mutual interference of oppositely directed communication signals on a single conductor in a switching network.

It is also an object of this invention to achieve a new and improved telecommunications switching network.

SUMMARY OF THE INVENTION

The foregoing and other objects of this invention are realized in one illustrative switching network arrangement in which the impedance at opposite ends of each crosspoint transmission path (as seen from the crosspoint) are deliberately and drastically mismatched. This causes the signal transmission in the direction from the high-to-low impedance to involve relatively large current variations as compared to very small voltage variations instead of the conventional current voltage changes. In the opposite direction through the network, signal transmission through a crosspoint path takes the form of large voltage variations but only negligible current changes. This relative disparity in current and voltage magnitudes of signals in polarities as determined by the direction of transmission through the high-low impedance network advantageously permits simultaneous bilateral transmission of signals on a single conducting path therethrough.

More specifically, a switching network system, according to one embodiment of the principles of this invention, comprises a pair of network stages interconnected by a junctor stage. Each of the network stages comprises a coordinate array of semiconductor crosspoints defining a plurality of conducting paths therethrough. At the access side of each network stage a plurality of line terminals couple a corresponding plurality of input-output circuit pairs to the network paths. The latter circuits may conveniently comprise transmission lines extending to sources of digital information and digital detectors, respectively. Each of the line terminals includes a coupling circuit between the input-output circuits and a crosspoint of a selected network path, which coupling circuit presents to the crosspoint an impedance which is small in comparison with the impedance of the transmission lines of the input-output circuits.

At the junctor side of each network stage, another plurality of coupling circuits is provided for coupling the network paths of one stage to those of the other. Each of the latter coupling circuits presents to the crosspoint of a selected path in its network stage an impedance which is large in comparison with the impedance of the transmission lines of the input-output circuits of the network stages. The network system is thus symmetrically organized, presenting two sections which function identically but in opposite directions for the current and voltage conditions present. Each transmits signals therethrough to the other from its access side, that is, the low impedance side, to the junctor, or high impedance side, as voltage changes and each transmits signals from the other via its junctor side to its access side as current changes. In accordance with this invention, these current and voltage changes in opposite directions through each network stage may be transmitted simultaneously. Input signals applied simultaneously at the access side of each network stage during a given time interval are transmitted therethrough toward the junctor stage as voltage changes. In the junctor stage impedance transformations operate to convert the voltage changes to current changes in which form the simultaneous information is transmitted through the second network stages to the transmission lines of the output circuits at the access sides.

The voltage changes in each network produce only negligible current changes since these changes see a high impedance at the junctor side of the networks. Very little interaction as a result occurs with the current output signals appearing at the same access side of a network stage. The interaction of negligible voltage changes caused by the latter current changes is also small when the series impedance of the selected network path is small when added to the impedance of the access side of the network stage. By a suitable selection of circuit parameters whatever minor interactions that do occur may be conveniently controlled. Although a pair of network stages was assumed in the foregoing exemplary system, it will be appreciated that a single stage system is equally feasible in practicing this invention.

In the embodiment of the invention just considered, transistor coupling networks are used at opposite ends of the transmission paths through the network stages to achieve the required impedance transformations. At the access side of the network stage that is, the input of the crosspoint path, the coupling network takes the form of a transistor emitter follower, presenting the emitter output impedance to the crosspoint which is much lower than the impedance of the input-output circuits connected by the network system. At the output of the crosspoint, that is, the junctor side of the network stage, the coupling network also takes the form of a transistor emitter follower, presenting its base impedance to the crosspoint which is much higher than the input-output circuits of the network system. For transmission in opposite directions through the network stages a second transistor stage, also of the emitter follower configuration, presents a high collector impedance to the now input side of the crosspoint relative to the impedances of the input-output circuits of the network system.

It is thus a feature of this invention that information signals, for example, two binary bits, may be transmitted during the same time interval in opposite directions along the same transmission path in a switching network without substantial degradation in signal level.

Another feature of this invention is a symmetrical network arrangement capable of transmitting signals in either direction therethrough on any single selected conducting path.

It is a further feature of this invention that a single selected conducting path through a switching network is provided at each end with both input and output circuits for simultaneously transmitting and receiving information signals through the network.

BRIEF DESCRIPTION OF THE DRAWING

The objects and features of this invention will be better understood from a consideration of the detailed description of one illustrative embodiment thereof when taken in conjunction with the accompanying drawing in which.

DETAILED DESCRIPTION

Figure 1:
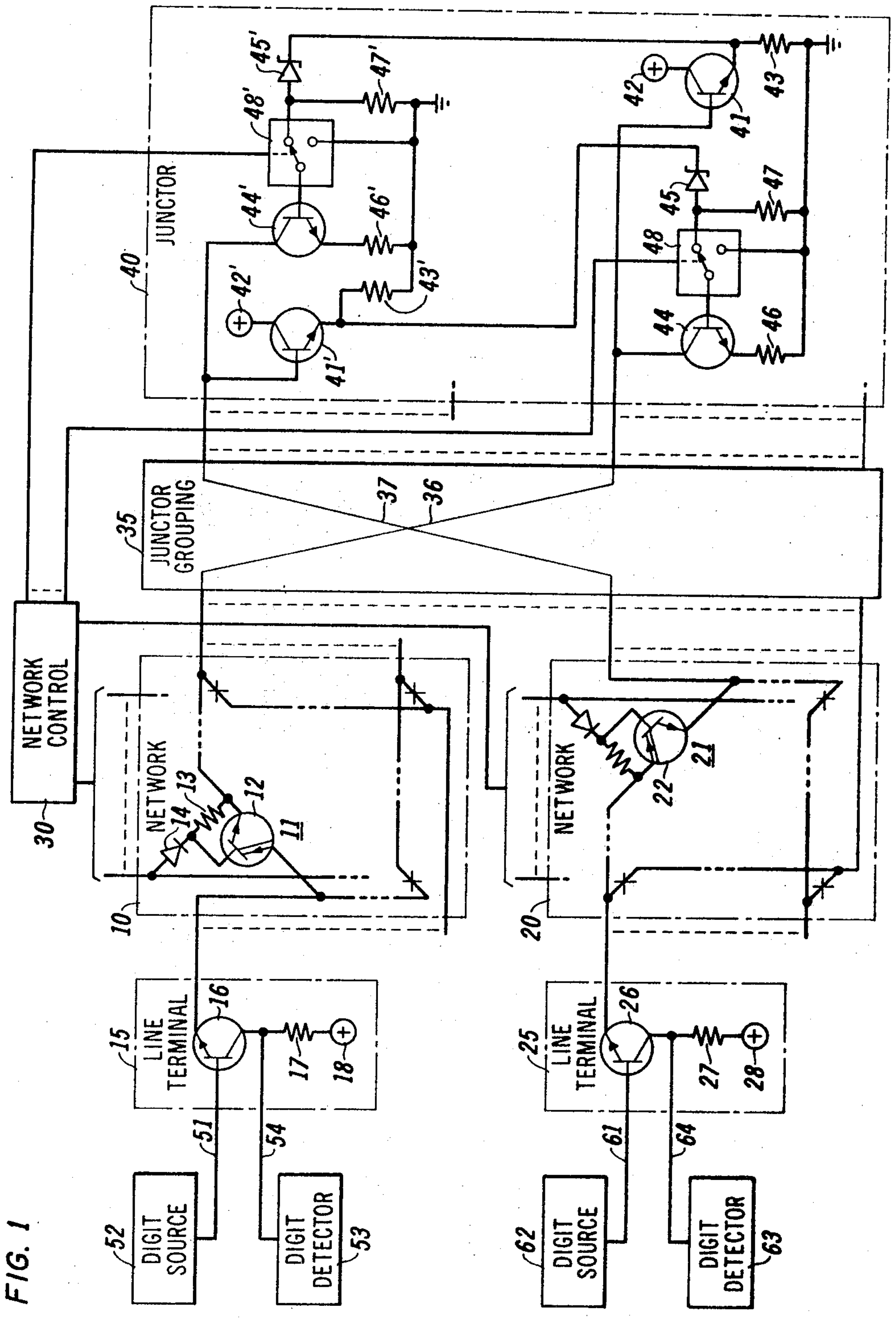
FIG. 1 depicts in schematic and block symbol form illustrative terminal circuits according to the principles of this invention in the context of a semiconductor switching network.

The organization of this invention is shown in FIG. 1 in the context of a communication switching network which for convenience is simplified to two single stage groupings 10 and 20. Each of the groupings comprises a plurality of coordinately arranged semiconductor crosspoints, representative crosspoints 11 and 21 of which are shown. The crosspoints may advantageously employ PNPN thyristors as the switch elements and, as shown in connection with crosspoint 11, comprise, in addition to a thyristor 12, a resistor 13 and a diode 14. The thyristor is rendered conductive by applying to its gate electrode a gating voltage pulse the amplitude of which is greater than a predetermined threshold level. When conductive, the thyristor presents between its anode and cathode a low impedance and remains conductive at the termination of the gating pulse as long as the anode-to-cathode current remains higher than a characteristic biasing level. The thyristor is returned to its high impedance, or OFF state, by interrupting the anode-to-cathode current. Resistor 13 is added to improve the thyristor "turn-on" threshold against transient voltages. Diode 14 is added in series to each thyristor base for isolation purposes.

Control of the network groupings 10 and 20, i.e., selection of particular crosspoints and idle links between the two, is provided by a network control circuit 30 which selectively applies the gating pulses mentioned in the foregoing to render conductive the thyristors 12 and 22, for example, defining a predetermined transmission path. Details of the control circuit 30 are known in the art as is their function and need not be described here further than to specify the character of the pulses supplied and their timing. The network control circuit 30 typically is in turn controlled by the central control of the system with which the network of FIG. 1 and the embodied invention may be adapted for use.

A junctor grouping frame 35 provides link-to-link connections between the two network groupings 10 and 20 through a junctor stage 40. The latter stage includes terminal circuitry in accordance with the principles of this invention for bilateral transmission through the network stages which complements the circuitry at the line terminal end of the network. At that end, two terminals 15 and 25 are specifically shown which, it will be understood, comprise only representative ones of a plurality of such stages terminating the network groupings 10 and 20. The two line terminal circuits 15 and 25 are identical and, referring to circuit 15, comprise an NPN transistor 16 having its emitter connected to an input of the network grouping 10 and its collector connected through a resistor 17 to a source of positive potential 18. The base of transistor 16 comprises the input to the network grouping 10 to which input is connected, via an input transmission line 51, any suitable source of digital pulses 52.

An output is taken at the same end of the network at the collector of transistor 16 which output may advantageously be detected at a digit detector 53 via an output transmission line 54. The source 52 and detector 53 may comprise any suitable circuits known in the art adapted to provide and receive input and output signal pulses of the character to be described. These circuits in practice, for example, may comprise components of the system with which this invention is adapted for use. A source of digital pulses 62 and a digit detector 63 are similarly connected, respectively, to the base and collector of transistor 26 of the line terminal 25 via transmission lines 61 and 64 associated with network grouping 20. As a result of transistor characteristics, the emitter impedances of transistors 16 and 26 are low when seen from crosspoints 11 and 21 with respect to transmission lines 51 and 54 and 61 and 64, respectively.

At the junctor 40 end of the network, output and input terminal circuitry is provided for the input and output terminals of the line terminals 15 and 25 just described. A signal applied to the base of the transistor 16, for example, is detected, after transmission through the network grouping 10 and junctor grouping 35 via conductor 36, at the emitter of an NPN transistor 41. The signal is applied to the base of the latter, which base presents a high impedance to the crosspoint of network grouping 10 with respect to the transmission lines 51 and 54. The collector of transistor 41 is connected to a source of positive potential 42 and its emitter is connected to ground through a resistor 43.

In a similar manner, at the other side of network system, signals applied to the base of transistor 26 at line terminal 25 are detected at junctor 40 at the emitter of a second output transistor 41′, the base of which serves as a high impedance input to the junctor. The collector of transistor 41′ is also connected to a positive potential source 42′ and its emitter is connected through resistor 43′ to ground.

Since this invention contemplates the transmission in both directions simultaneously over a single transmission path through the two network groupings 10 and 20 between any selected line terminals such as terminals 15 and 25, interconnecting input circuits are also provided at the junctor 40 for the path segments having outputs at the latter line terminals. Thus, for the path terminating at line terminal 15, the input circuit comprises an NPN transistor 44 having its collector connected to that path segment and also, it may be noted, to the base of transistor 41 which comprises an output to the same path segment. Transistor 44 has signals applied thereto at its base through a zener diode 45 and a switch 48. The emitter and base of transistor 44 are connected to ground through resistors 46 and 47, respectively. The collector of transistor 44 presents a high impedance to the crosspoint 12 of network grouping 10 with respect to that of transmission lines 51 and 54.

Turning to the transmission path segment terminating at line terminal 25, it is apparent that identical input circuitry is provided for this path at junctor 40. Thus, a second NPN transistor 44′ having its high impedance collector connected to the latter path is also directly connected to the base of transistor 41′ which comprises an output to the path segment originating at line terminal 25. Transistor 44′ also has input signals applied to its base through a zener diode 45′ and a switch 48′. The emitter and base of transistor 44′ are each grounded through resistors 46′ and 47′, respectively.

At the junctor 40, the path segments through the network groupings 10 and 20 are interconnected to provide intermediate input-output stages as described in the foregoing. More specifically, the connections are as follows: the selected transmission path segment originating at line terminal 15, for example, is continued through junctor 40 from the emitter of transistor 41 to the base of transistor 44′ via the zener diode 45′ while the transmission path segment originating at line terminal 25, for example, is continued from the emitter of transistor 41′ to the base input of transistor 44 via the zener diode 45. As noted in the foregoing, each path section terminates at its line terminal end in a low impedance and at its junctor end in a high impedance as viewed at the crosspoints 11 and 21 of network groupings 10 and 20, both impedances being relative to the predetermined impedances of the transmission lines 51, 54, 61, and 64.

An exemplary path through the network groupings 10 and 20 interconnecting in one direction digit source 52 and digit detector 63 and in the opposite direction digit source 62 and digit detector 53 may be traced. From digit source 52 a signal is applied to the base of transistor 16 of line terminal 15, and is traced to the latter element's emitter, thence through network grouping 10 via the crosspoint thyristor 12, conductor 36 of junctor grouping 35 and base of output transistor 41 of junctor 40. The path continues via the base of transistor 44′ which element constitutes the input stage of the segment of the path traced through the network grouping 20. From the collector of the latter transistor, the segment is traced via conductor link 37 of junctor grouping 35, the selected crosspoint thyristor 22 of the grouping 20 to the emitter of transistor 26 of line terminal 25 and thence via the collector of the same transistor to digit detector 63. The same path may be traced in the reverse direction between the digit source 62 and digit detector 53 via the corresponding stages of junctor 40, that is, via output transistor 41′ of the path segment and input transistor 44 of the second segment of the path. In describing the path through the network groupings 10 and 20, junctor grouping 35, and junctor 40, it is manifest that only exemplary elements and stages encountered have been considered. Just as only representative ones of the line terminals 15 and 25 were described in the foregoing, only the junctor stages interconnecting the path segments are shown and described. In the actual practice of this invention the latter stages are individually provided for each of the available transmission paths through the network groupings.

With the foregoing organization of one illustrative embodiment of this invention in mind, a typical bilateral simultaneous transmission along a single transmission path through the network groupings may be described. For this purpose, the principles of this invention will be sufficiently understood from the manner in which a single binary bit, for example, a binary "1," is transmitted from each digit source 52 and 62 to a destination digit detector 63 and 53 during the same time interval. Reference is had in this connection to the pulse chart of FIG. 2. Before the transmission of information through the network, paths are defined therethrough in a coordinate selection manner. Initially, switches 48 and 48′ mentioned previously, perform the $x$ select function for the coordinate arrays of crosspoints and, at junctor 40, maintain the bases of transistors 44 and 44′ grounded thereby preventing conduction through these elements. The switches 48 and 48′ are shown in the drawings as representative mechanically operated, double-throw devices. It will be appreciated that these are symbolic only and in practice would comprise electronic switches capable of connecting the normally grounded bases of the transistors 44 and 44′ to the zener diodes 45 and 45′, respectively. The switches 48 and 48′, of which one is provided for each of the horizontal coordinates of the network groupings 10 and 20, are understood to be selectively controlled from the network controller 30 as determined by the availability of idle transmission paths.

Figure 2:
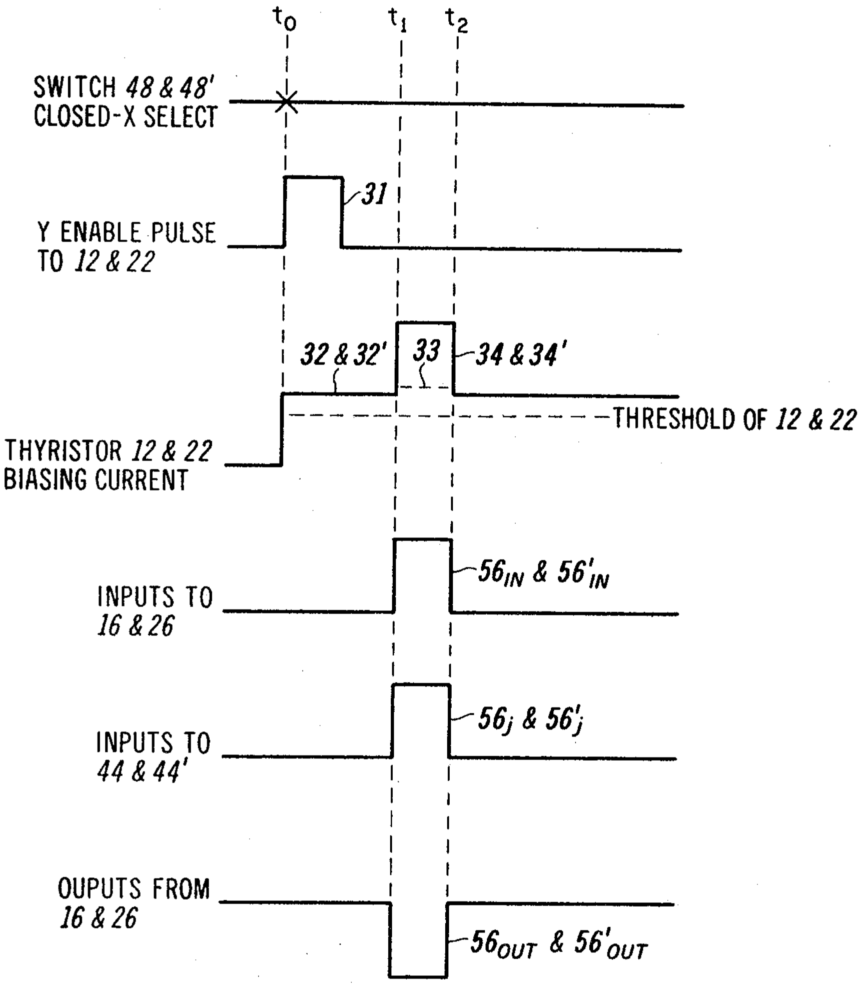
FIG. 2 depicts in idealized waveforms, typical current and voltage pulses present during an illustrative operation of the circuit of FIG. 1.

For purposes of description it is assumed that the transmission paths defined at the junctor grouping 35 as paths 36 and 37 are idle. Accordingly, network controller 30, by closing $x$ select switches 48 and 48′, connects a current source, transistor 44 and 44′, respectively, to each of these paths. This is indicated in FIG. 2 as occurring at time $t_0$. At the same time, a $y$ select positive voltage pulse 31 is applied from network controller 30 simultaneously to the gate electrodes of the columns of crosspoint thyristors including the thyristors 12 and 22 through the associated diodes thereby switching these thyristors to their low impedance states. As a result, a biasing current 32 is created in the transmission path segments which may be traced through the network 10 path segment as follows: source 18 and resistor 17, collector and emitter of transistor 16, thyristor 12, and collector and emitter of transistor 44 through resistor 46 to ground. The biasing current 32 is of a greater magnitude, as determined by resistor 46 and the voltage appearing on the emitter of transistor 44, than that sufficient to maintain the thyristor 12 conductive after the termination of gate enabling pulse 31 for reasons which will appear hereinafter. A similar biasing current, not represented in the drawing, is generated in the transmission path segment including the thyristor 22 and is similarly traceable through the corresponding elements of that path from source 28 through transistor 44′.

With the two segments of the single conducting path now available and prepared for transmission of signals therethrough, binary pulses may be transmitted simultaneously from digit source 52 to digit detector 63 and from digit source 62 to digit detector 53. As mentioned in the foregoing, an exemplary operation of this invention will be demonstrated by simultaneously transmitting between these originations and destinations a binary "1" during the same time slot $t_1$–$t_2$. Positive voltage pulses $56_{in}$ and $56'_{in}$ representative of the inputs are applied during this interval from the sources 52 and 62 to the bases of transistors 16 and 26, respectively. With respect to the transistor 16, voltage pulse $56_{in}$ causes its emitter to undergo the same voltage change as does its base and this voltage change is transmitted through the network grouping 10 from the low impedance emitter to the high impedance base of transistor 41 at the junctor 40. The collector of transistor 44 is reverse biased thereby preventing grounding of the voltage signal through resistor 46. The same voltage change through the network grouping 20 and across transistor 41′ occurs as a result of the voltage pulse $56'_{in}$ applied from the source 62 to the input of transistor 26. Any current generated in the two transmission path segments due to capacitive loading of the transmission path segment will be measured at the collector loads 17 and 27 of transistors 16 and 26, respectively. This current is represented in FIG. 2 by the broken line increase 33 of biasing current 32. The biasing current 32 is maintained sufficiently high so that the current in no event is reduced below the threshold level of the thyristors 12 and 22 and these elements remain conductive.

So far the simultaneous transmission of the input signals $56_{in}$ and $56'_{in}$ at opposite ends of the network groupings through the first segments of the transmission paths has been considered. The transmission of these binary pulses is completed along the second segments of the paths to the digit detectors 53 and 63 as follows. The voltage change caused by the transmission of the pulse $56_{in}$ from line terminal 15 appearing across resistor 43 at junctor 40 is transmitted via diode 45' to the base of transistor 44' and is represented for convenience in FIG. 2 by the junctor waveform $56_j$. The diode 45' provides a suitable voltage shift to maintain the required bias for transistor 44'. The same change appears across the emitter of the latter element and its resistor 46'. This change now causes a positive current swing through the collector of transistor 44' which current change is transmitted through conductor 37 of junctor grouping 35, thyristor 22, and the low impedance emitter and the collector of transistor 26 of line terminal 25. This current is shown in FIG. 2 as the current waveform 34 superimposed on the biasing current 32 already present in the transmission path. This current appearing across resistor 27 of line terminal 25 is detected as an output voltage signal $56_{out}$ by the digit detector 63.

The voltage $56'_j$ taken across resistor 43' of transistor 41' is similarly applied via zener diode 45 to the base input of transistor 44 and transmitted as a current change 34' through the network grouping 10 to be detected as a voltage output $56'_{out}$ by the digit detector 53 in a manner identical to that described in the foregoing. In recapitulation, the binary "1" signals $56_{in}$ and $56'_{in}$ are transmitted from opposite ends of the network groupings 10 and 20 toward the junctor 40 as voltage changes associated with virtually negligible current changes. On the other hand, the transmission of these same binary "1" signals is continued, again in opposite directions through the network groupings, away from the junctor 40 as current changes through the second path segments with virtually negligible voltage changes.

In the bilateral transmission described in the foregoing, some interaction between the two directions of transmission may occur. By a suitable choice of circuit parameters, however, this interaction may be controlled. Normally, the path through the network has some capacitive loading. As a result, if fast rise time pulses are employed for transmitting the digital signals, additional disturbances may be created at the output terminals of transistors 16 and 26 by the inputs $56_{in}$ and $56'_{in}$. Considering the bilateral transmission through one segment of the network path, for example, the segment between line terminal 15 and input and output transistors 44 and 41 of junctor 40, changes in network bias current 32, indicated as 33 in FIG. 2, as a result of voltage input $56_{in}$ are given by $$\Delta I_b = C\frac{\Delta E_{\rm in}}{\Delta t} \qquad (1)$$

and $$\Delta E'_{\rm out} = R_1 C\frac{\Delta E_{\rm in}}{\Delta t} \qquad (2)$$

where $\Delta E_{in}$ is the change in input voltage pulse $56_{in}$ as a function of time $\Delta t$, $\Delta E'_{out}$ is the change in output $56'_{out}$, C is the capacitive loading of the network transmission path segment, and $R_1$ is the value of resistor 17.

A second source of interaction between the two directions of transmission is due to voltage changes produced on a network path by the current mode of signal transmission from the junctor 40 to the line terminals 15 and 25. As previously mentioned, voltage inputs from transistor stage 41 to transistor stage 44', i.e., $56_j$, are converted into current changes, and network bias current 32', which flows from transistor 44' to transistor 26, is changed as a function of the voltage change $56'_j$. Thus, $$\Delta I = \frac{\Delta E_{\rm in}}{R_2'} \qquad (3)$$

where $\Delta E_{in}$ is the change in voltage $56'_j$ and $R'_2$ is the value of resistor 46'. The current changes ΔI produce a voltage change in the path from transistor 44' to transistor 26 and on the base of transistor 41'.

This voltage change, although small, will cause some interaction with the opposite direction of transmission. The voltage change produced in the network path is a function of the current changes ΔI, and a function of the series impedance of the network path 37, the series impedance of thyristor 22, and the input impedance of the emitter of transistor 26. Defining this total path impedance as $R_{eq}$, the voltage change produced in the path at the base of transistor 41' is $$\Delta E_{out} = \Delta I R_{eq}\,. \qquad (4)$$

The voltage change $\Delta E_{out}$, transmitted from transistor 41' to the base and the emitter of transistor 44, causes a current change in path 36 from transistor 44 to transistor 16. Thus, $$\Delta I_c = \Delta I\frac{R_{\rm eq}}{R_2} \qquad (5)$$

where $\Delta I_c$ is the current change in path 36 and $R_2$ is the value of resistor 46. The current change $\Delta I_c$ is transmitted to the emitter and the collector of transistor 16 and is transmitted to detector 53 via path 54 as $$\Delta E''_{\rm out} = \Delta I_c R_1 = \Delta I\frac{R_{\rm eq}}{R_2}R_1 \qquad (6)$$

or $$\Delta E''_{\rm out} = \left(\frac{\Delta E_{\rm in}}{R_2'}\right)\left(\frac{R_{\rm eq}}{R_2}\right)R_1 \qquad (7)$$

where $R_1$ is the value of resistor 17 and $E''_{out}$ is the voltage change on transmission line 54 due to voltage changes produced in the network path from transistor 44' to the transistor 26. In general, for unity gain through the network path, $$R_1 = R_2 = R_2' \qquad (8)$$

and therefore $$E'_{\rm out} = \Delta E_{\rm in}\frac{R_{\rm eq}}{R_1}\,. \qquad (9)$$

To assure proper transmission in both directions in the network paths, the two interference sources described by equations (2) and (9) should be minimized. Therefore, the following relationships should be maintained $$\frac{R_{\rm eq}}{R_1} \ll 1 \qquad (10)$$

and $$\frac{R_1 C}{\Delta t} \ll 1. \qquad (11)$$

It will be apparent that the foregoing quantitative consideration of bilateral transmission through the network path between line terminal 15 and the junctor 40 applies with equal force to the same transmission between the line terminal 25 and the junctor 40. In the foregoing description of an illustrative transmission operation of a network circuit according to this invention it was assumed that a binary "1" was transmitted from each line terminal to the other during the same time slot. A binary "0" would be transmitted between those points in the conventional manner by the absence of a voltage pulse from the sources 52 and 62 during the time interval under consideration.

What has been described is considered to be only one illustrative embodiment of this invention and it is to be understood that various and numerous other arrangements may be devised by one skilled in the art without departing from the spirit and scope of the invention as defined by the accompanying claims.

What is claimed is:

1. In a communication system, a switching network comprising an array of crosspoint switches defining a plurality of conducting paths therethrough, a first plurality of pairs of input and output circuits, a second plurality of pairs of input and output circuits, each of said input and output circuits having a predetermined individual impedance, first circuit means for coupling a selected pair of said first pairs of input and output circuits to one end of a single one of said conducting paths, said first circuit means presenting an impedance to the crosspoint switch in said last-mentioned path greater than said predetermined individual impedance of said selected pair of said first pairs of input and output circuits, and second circuit means for coupling the other end of said one of said conducting paths to a selected pair of said second pairs of input and output circuits, said second circuit means presenting an impedance to the crosspoint switch in said last-mentioned path less than said predetermined individual impedance of said selected pair of said second pairs of input and output circuits.

2. In a communication system, the combination according to claim 1 in which the input circuit of said selected pair of said first pairs of input and output circuits includes means for applying a first input signal to said one end of said conducting path and in which the input circuit of said selected pair of said second pairs of input and output circuits includes means for applying a second input signal to said other end of said conducting path simultaneously with said first input signal.

3. In a communication system, the combination according to claim 2 in which the output circuits of said selected pairs of said first and second pairs of input and output circuits each include means for detecting signals transmitted through said switching network in each direction along said conducting path.

4. In a communication system, the combination according to claim 3 in which said first circuit means comprises a transistor stage presenting its collector impedance to said crosspoint in said one of said conducting paths and said second circuit means comprises a transistor stage presenting its emitter impedance to said last-mentioned crosspoint.

5. In a communication system, the combination according to claim 4 in which said first and second circuit means comprise common emitter and common base, like conductivity type transistors, respectively, and the collector current of said first circuit means passes through said crosspoint and constitutes the emitter current of said second circuit means.

6. In a communication system, the combination according to claim 4 in which said first circuit means also comprises a transistor stage presenting its base impedance to said crosspoint in said one of said conducting paths.

7. A communications switching system comprising a first plurality of input transmission lines and a first plurality of output transmission lines, each of said lines having a predetermined impedance, a first switching network comprising an array of crosspoint switches defining a plurality of first conducting paths therethrough, a first plurality of input and output circuits each having said predetermined impedance, first circuit means for coupling a selected one of said first plurality of input transmission lines and a selected one of said first plurality of output transmission lines to one end of a single one of said first conducting paths, said first circuit means presenting an impedance to the crosspoint switch in said last-mentioned path less than said predetermined impedance of said selected ones of said input and output transmission lines, and second circuit means for coupling the other end of said single one of said first conducting paths to selected ones of said first plurality of input and output circuits, said second circuit means presenting an impedance to the crosspoint switch in said last-mentioned path greater than said predetermined impedance of said input and output circuits.

8. A communication switching system according to claim 7 also comprising a second plurality of input transmission lines and second plurality of output transmission lines, each of said last-mentioned lines having said predetermined impedance, a second switching network also comprising an array of crosspoint switches defining a plurality of second conducting paths therethrough, a second plurality of input and output circuits each also having said predetermined impedance, third circuit means for coupling a selected one of said second plurality of input transmission lines and a selected one of said second plurality of output transmission lines to one end of a single one of said second conducting paths, said third circuit means presenting an impedance to the crosspoint switch in said last-mentioned conducting path less than said predetermined impedance of said selected ones of said input and output transmission lines, and fourth circuit means for coupling the other end of said single one of said second conducting paths to selected ones of said second plurality of input and output circuits, said fourth circuit means presenting an impedance to the crosspoint switch in said last-mentioned path greater than said predetermined impedance of said input and output circuits.

9. A communication switching system according to claim 8 in which said first and third circuit means each comprises a transistor stage presenting its emitter impedance to said respective crosspoint switch and said second and fourth circuit means each comprises a first transistor stage presenting its collector impedance to said respective crosspoint switch.

10. A communication switching system according to claim 9 in which said second and fourth circuit means each also comprises a second transistor stage presenting its base impedance to said respective crosspoint switch, the emitters of the first transistor stage of said second and fourth circuit means being connected respectively to the bases of the second transistor stage of said fourth and second circuit means.

11. A communication switching system according to claim 10 also comprising first information source means for applying a first input signal to said selected one of said first plurality of input transmission lines, second information source means for applying a second input signal to said selected one of said second plurality of input transmission lines, said first and second source means being operable simultaneously whereby said first and second input signals are transmitted simultaneously in opposite directions along said single ones of said first and second conducting paths through said networks.

12. A communication switching system according to claim 11 also comprising signal detector means connected to each of said selected ones of said first and second plurality of output transmission lines.

13. An electrical switching system comprising a first and a second plurality of pairs of input and output transmission lines, each of said lines having a predetermined impedance, a first and a second switching network each comprising an array of crosspoint switches defining respectively a first and a second plurality of conducting paths therethrough, first and second circuit means for coupling respectively a selected pair of said first plurality of pairs of input and output transmission lines and a selected pair of said second plurality of pairs of input and output transmission lines to one of the ends of a single selected one of said first and second plurality of conducting paths, said first and second circuit means each presenting an impedance to the crosspoint switch of the respective conducting path less than said predetermined impedance of said selected input and output transmission lines, and a junctor circuit for interconnecting said first and second switching networks comprising a first and a second pair of impedance converting circuits for coupling the other ends of said single selected one of said first and second plurality of conducting paths, said last-mentioned circuits each presenting an impedance to the crosspoint switch of the respective conducting path greater than said predetermined impedance of said selected input and output transmission lines.

14. An electrical switching system according to claim 13 in which said first and second circuit means each comprises a transistor stage presenting its emitter impedance to the crosspoint switch of the respective selected conducting path and having the input and output transmission lines of the respective selected pair of said first and second plurality of pairs of input and output transmission lines connected respectively to its base and collector and in which said first and second pair of impedance converting circuits each comprises a first and a second transistor stage having the base of one transistor and the collector of the other transistor both connected respectively to said other ends of said selected conducting paths.

15. An electrical switching system according to claim 14 in which the emitter of the said one transistor of each pair of converting circuits is connected to the base of the said other transistor of the other pair of converting circuits.

16. An electrical switching system according to claim 15 also comprising signal source means connected to each of the input transmission lines of said selected pair of said first and second plurality of pairs of input and output transmission lines, said source means being operable to apply simultaneously an input signal to the corresponding ends of said single selected conducting paths, said input signals being transmitted through said first and second networks toward said junctor circuit substantially as voltage changes and from said junctor circuit toward said output transmission lines substantially as current changes.

17. A bilateral communication circuit comprising a pair of stations, a transmission medium having a single active conducting path connecting said stations, an input and an output circuit associated with each station each having a predetermined impedance, first circuit means at one station for coupling both said associated input and said output circuit to one end of said conducting path, said firs circuit means presenting an impedance to said conducting path less than said predetermined impedance, second circuit means at the other station for coupling both said associated input and output circuit to the other end of said conducting path, said second circuit means presenting an impedance to said conducting path greater than said predetermined impedance, and signal source means operable to apply simultaneous input signals to the input circuits associated with both said stations.

18. A bilateral communication circuit according to claim 17 in which said transmission medium comprises an array of semiconductor crosspoint switches defining a plurality of conducting paths therethrough including said single active conducting path.

* * * * *